United States Patent Office 3,421,975
Patented Jan. 14, 1969

3,421,975
REVERSIBLE FLOCCULATION AND REDISPERSION OF CHRYSOTILE ASBESTOS
Robert G. Woolery, Monroe, and William H. Dresher, Warwick, N.Y., assignors to Union Carbide Corporation, a corporation of New York
No Drawing. Filed Apr. 30, 1965, Ser. No. 452,360
U.S. Cl. 162—3                                  11 Claims
Int. Cl. C03b 37/00; C04b 43/04

ABSTRACT OF THE DISCLOSURE

Asbestos fibers are dispersed in water, and flocculated by adjusting the pH to 6 to 10.5 by the addition of an alkaline reagent such as ammonium hydroxide, water soluble hydroxides, carbonates and phosphates of the alkali metals and of the alkaline earth metals. The flocculation produces an increase in freeness and thus quick separation of fibers from the water. The dried asbestos fibers may be redispersed in water by adjustment of the pH of the mixture in the range of 4 to 6 with a monobasic acid.

---

This invention relates to a method for producing a dry finely divided chrysotile asbestos product which is readily capable of being redispersed in water to form a colloidal suspension of the asbestos fibers, and to the method of redispersing said dry asbestos.

Asbestos is conventionally refined from the ore by a series of mechanical chopping and screening operations which separate coarse and fine rock and other impurities sometimes referred to as "gangue" from the asbestos. Even after such mechanical refining the asbestos exists, for the most part, in the form of fiber bundles. In order to obtain a highly purified asbestos product it is necessary to break up or defibrilate the fiber bundles into the individual, discrete fibers which are of colloidal size.

It has long been known that the chrysotile asbestos fiber bundles can be defibrilated and the individual fibers dispersed in water by simultaneous mechanical agitation and chemical treatment of the fibers so as to render them electrostatically mutually repulsive. Examples of such processes are given in U.S. Patent Nos. 1,907,616 and 2,661,287. In accordance with these methods the asbestos suspension gains its stability by achieving a high concentration of electropositive charges on the surface of the individual asbestos fibers. The resulting repulsive (coulombic) forces are thus made sufficiently large to overwhelm the attractive (Van der Waals) forces between the particles. In such dispersions the individual fibers of chrysotile asbestos, which are tubular in structure, have variable external diameters of from about 200 to 800 A., and indeterminant fiber lengths when viewed under an electron microscope at a magnification of about 25,000 times.

For many commercial purposes, asbestos is used as an aqueous dispersion having a low solids content, in the neighborhood of a few percent. Shipping such dispersions is prohibitively costly, hence a dry asbestos product must be prepared and shipped to the user who then redisperses the asbestos in water. According to the prior art, a dry product can be prepared either by evaporating the water from the dispersion, or by flocculating the dispersed asbestos, filtering it, and drying the filter cake. In the past, it was believed that the water from the dispersion had to be evaporated in order to obtain a product which retained the dispersing reagent adsorbed on the fibers so they could be redispersed again. Flocculation has been accomplished by the use of alum and various water soluble, high molecular weight organic polymers. However, these flocculants are useful only if the asbestos is to be formed into matted articles, since the ability to redisperse the asbestos is lost due to the irreversible mechanism by which these flocculants operate. Hence, the prior art flocculants cannot be used if an asbestos product is sought in which the individual fibers can easily be redispersed in water.

Flocculation of the asbestos dispersion is, however, necessary in order to separate the dispersed asbestos from the water, because in the dispersed state the asbestos fibers cannot be filtered since the individual fibers enter into and plug the pores of the filter media. Neither can the asbestos be separated from the water by gravitational means, such as settling, since the dispersons are stable over a prolonged period of time. Since such dispersons ordinarily contain only about 5% asbestos by weight, evaporating 95 pounds of water to obtain 5 pounds of asbestos is far too expensive to be commercially feasible. An additional reason for the desirability of separating the asbestos by filtration is that it enables the water to be re-used in the purification process.

It is an object of this invention to produce a dry asbestos product which is easily redispersible in water.

It is another object of this invention to cause flocculation of a colloidal dispersion of chrysotile asbestos in such manner that the dried flocs of asbestos retain their ability to be redisperesd in water so as to form a stable colloidal dispersion therein.

It is still another object of this invention to redisperse dry flocculated asbestos in water.

One aspect of this invention consists of a process for producing a dry asbestos product which is easily redispersible in water, comprising the steps of (1) providing an aqueous colloidal dispersion of chrysotile asbestos fibers containing up to about 5 weight percent asbestos (2) raising the pH of said dispersion to be within the range of 6.0 to 10.5, thereby flocculating the asbestos fibers, (3) separating the flocculated asbestos from the supernatant water by filtration, and (4) drying the filtered asbestos fibers.

In the flocculation step, a water soluble alkaline reagent is used to adjust the pH. Suitable materials include ammonium hydroxide and the water soluble hydroxides, carbonates and phosphates of the alkali metals and of the alkaline earth metals. Illustrative materials include sodium hydroxide, sodium carbonate, sodium phosphate, potassium hydroxide, potassium carbonate, potassium phosphate, barium hydroxide and strontium hydroxide. Sodium carbonate and sodium hydroxide are preferred.

The flocculation must be carried out within the range of about 6.0 to 10.5. A pH of 6 is the lower limit, since below that point the dispersion remains stable, i.e. it will not flocculate; nor will flocculation occur above pH 10.5, since the character of the surface charge changes from positive to negative. This point, which is the zero point of charge, is referred to as the isoelectric point of chrysotile asbestos. The preferred range is a pH of 8.0 to 10.0.

The flocculation process can be regulated conveniently by visual observation of the consistency of the slurry. As the flocculating reagent is added to the asbestos dispersion, there is a general thickening of the suspension due to the formation of a gel phase. In this state there is no visible difference between the gel and the water media. As more reagent is added, there is a loosening of the suspension, characterizing floc formation. At this point there are two distinct phases clearly visible and this indicates that sufficient reagent has been added to enable the suspension to be filtered.

The preferred method of causing the flocculation of the dispersed asbestos consists of slowly adding a solution containing up to about 40 percent by weight sodium carbonate to the asbestos suspension until a pH of at least 8 is reached. Flocculation, however, begins at a pH of about 6.0. During the alkali addition, the slurry should be agitated gently in order to assure an even distribution of the reagent to the asbestos fibers in suspension. A gentle "kneading" motion is desirable but not essential.

The term "filtration" as used herein is intended to include all of the various filtration techniques and means known in the art. Thus, the filtration may be vacuum filtration, gravity filtration, pressure filtration or centrifugal filtration. These may be continuous or intermittent in action. The filtration may be preceded by decantation of the supernatant liquor from the flocculated asbestos dispersion. The higher the pH of the flocculated slurry, the faster is the filtration rate. The filtered asbestos cake may be dried by conventional means well known to those skilled in the art.

Although the dried asbestos product is itself useful for numerous applications, such as a filler for cements and organic resins, it is frequently necessary to redisperse the dry asbestos in water.

Another aspect of this invention consists of a method by which the dry asbestos, prepared in accordance with the method described above, can be colloidally redispersed in water. This method comprises adding up to about 5% by weight of the dry asbestos to water and adjusting the pH of the mixture to be within the range of about 4.0 to 6.0 with a monobasic acid. The mixture or slurry should be agitated to insure uniform distribution of the asbestos and to break up any agglomerates.

The water used to make up the dispersion must contain no more than 100 p.p.m. of monovalent anions and no more than 10 p.p.m. of multivalent anions. Deionized or distilled water meets these requirements. The presence of greater quantities of anions than specified above prevents the formation of stable dispersions by interfering with the electrostatic dispersion mechanism.

The pH range within which the dispersion is stable is from about 4.0 to 6.0. At a pH below 4.0 the acidity becomes too strong and the asbestos is leached by the acid beyond tolerable limits. At a pH above 6.0 flocculation begins to take place.

The pH adjustment may be made with any monobasic carboxylic acid having up to 6 carbon atoms or with inorganic acids such as hydrochloric and nitrous acid. Formic and acetic acids are the preferred organic acids.

No more than about 5% by weight can conveniently be redispersed in water since at higher solids concentrations the dispersion becomes too viscous to handle.

Any form of chrysotile asbestos can be employed in the present invention. The preferred type, however, is short fibered material obtained from deposits near Coalinga, Calif. Asbestos mined at this location is short fibered chrysotile asbestos which would be classified as Grade 7 according to the Canadian Standards Classification.

The following examples are given for purposes of illustration only and are not intended to limit the scope of the invention.

Example I

Seven milliliters of a 1% by weight solution of sodium hydroxide was added to an aqueous colloidal dispersion containing 1% chrysotile asbestos, having a viscosity of 1.5 centipoises at 25° C. (measured by a Brookfield Type LVF Viscosimeter using a No. 1 spindle at 60 r.p.m.). The mixture was gently stirred. As soon as the alkali was added, curd-like precipitates began to form in the beaker. The pH of the mixture was 10.0. The contents of the beaker were poured into a 11.0 centimeter Buchner funnel lined with Whatman No. 41 H filter paper. Suction was applied to the funnel by a water aspirator. The mixture filtered easily in less than two mintues. The filter cake was removed from the funnel and dried at 110° C. in an electric oven.

To reconstitute the dry asbestos, it was poured into a Waring Blendor jar containing 300 milliliters of deionized water. The blender was turned on at low speed (approximately 7500 r.p.m.) and a 0.1 molar hydrochloric acid solution was titrated into the jar until a pH of 4.5 was reached. The blender was turned off after less than a minute of stirring and the dispersion was poured into a beaker. During the pouring, it was noted that the asbestos dispersion had a pearlescent shimmer characteristic of an asbestos dispersion. The reconstiuted dispersion had a viscosity of 1.5 centipoises.

Example II

Thirteen milliliters of a 1% by weight solution of sodium carbonate were added to an aqueous colloidal dispersion containing 1% chrysotile asbestos, having a viscosity of 1.5 centipoises at 25° C. As soon as the alkali was added, curd-like precipitates began to form in the beaker. The pH of the mixture was 8.6. The contents of the beaker were poured into a 11.0 centimeter Buchner funnel lined with Whatman No. 41 H filter paper. Suction was applied to the funnel by a water aspirator. The mixture filtered easily in about 1½ mintues. The filter cake was removed from the funnel and dried at 110° C. in an electric oven.

To reconstitute the asbestos, it was poured into a Waring Blendor jar containing 300 milliliters of deionized water. The blender was turned on at low speed and a 0.1 molar hydrochloric acid solution was titrated into the jar until a pH of 4.5 was reached. The blender was turned off after less than a minute of stirring and the dispersion was poured into a beaker. During the pouring it was noted that the asbestos dispersion had a pearlescent shimmer. The reconstituted dispersion had a viscosity of 1.5 centipoises.

Example III

Seven milliliters of a 1% by weight solution of trisodium phosphate was added to an aqueous colloidal dispersion containing 1% chrysotile asbestos, having a viscosity of 1.5 centipoises at 25° C. As soon as the alkali was added, curd-like precipitates began to form in the beaker. The pH of the mixture was 6.5. The contents of the beaker were poured into a 11.0 centimeter Buchner funnel lined with Whatman No. 41 H filter paper. Suction was applied to the funnel by a water aspirator. The time required to filter the mixture was 1.08 minutes. The filter cake was removed from the funnel and dried at 110° C. in an electric oven.

To reconstitute the asbestos, it was poured into a Waring Blendor jar containing 300 milliliters of deionized water. The blender was turned on at low speed and a 0.1 molar hydrochloric acid solution was titrated into the jar until a pH of 4.5 was reached. The blender was turned off after less than a minute of stirring and the dispersion was poured into a beaker. During the pouring, it was noted that the asbestos dispersion had a pearlescent shimmer. The reconstituted dispersion had a viscosity of 1.5 centipoises.

What is claimed is:
1. A method for producing a dry asbestos product which is easily re-dispersible in water comprising the steps of:
  (1) providing an aqueous colloidal dispersion consisting essentially of chrysotile asbestos fibers containing up to about 5 weight percent asbestos,
  (2) raising the pH of said dispersion to be within the range of 6.0 to 10.5, by the addition thereto of a flocculant consisting essentially of a water soluble alkaline reagent selected from the group consisting of ammonium hydroxide and the water soluble hydroxides, carbonates, and phosphates of the alkali metals and of the alkaline earth metals,
  (3) separating the flocculated asbestos from the supernatant water, and
  (4) drying the filtered asbestos fibers.
2. The process of claim 1 wherein the pH is adjusted to be within the range of 8.0 to 10.0.

3. The method of claim 1 wherein the pH is adjusted with sodium carbonate.

4. The method of claim 1 wherein the pH is adjusted with sodium hydroxide.

5. A method for redispersing dry asbestos comprising:
 (1) adding up to about 5 percent by weight of dry asbestos prepared in accordance with the method of claim 1 to water containing no more than 100 p.p.m. of monovalent anions and no more than 10 p.p.m. of multivalent anions, and
 (2) adjusting the pH of the mixture to be within the range of from about 4.0 to 6.0 with a monobasic acid.

6. The method of claim 5 wherein the monobasic acid is selected from the group consisting of formic, acetic, hydrochloric and nitrous acid.

7. The method of claim 5 wherein the monobasic acid used is acetic acid.

8. The method of claim 5 wherein the monobasic acid used is hydrochloric.

9. The method of claim 5 wherein the mixture of asbestos and water is agitated while the pH is being adjusted.

10. The method of claim 5 wherein the water used to prepare the asbestos dispersion is deionized water.

11. The method of claim 5 wherein the water used to prepare the asbestos dispersion is distilled water.

References Cited

UNITED STATES PATENTS

| | | | |
|---|---|---|---|
| 1,545,132 | 7/1925 | Drambour | 162—3 X |
| 1,971,162 | 8/1934 | Novak | 162—155 |
| 2,652,325 | 9/1953 | Novak | 162—153 X |

HOWARD R. CAINE, *Primary Examiner.*

U.S. Cl. X.R.

162—153